United States Patent [19]

Shamie

[11] Patent Number: 4,765,645

[45] Date of Patent: Aug. 23, 1988

[54] SAFETY SPREADER BAR LOCK FOR UMBRELLA STROLLER

[76] Inventor: Louis Shamie, 972 Dean St., Brooklyn, N.Y. 11238

[21] Appl. No.: 8,821

[22] Filed: Jan. 30, 1987

[51] Int. Cl.⁴ ............................................. B62B 7/08
[52] U.S. Cl. .................................... 280/644; 280/42; 280/650; 403/102
[58] Field of Search ................. 280/642, 644, 42, 650, 280/658; 403/100, 101, 102

[56] References Cited

U.S. PATENT DOCUMENTS

| | | | |
|---|---|---|---|
| 2,467,579 | 4/1949 | Boudreau | 403/100 |
| 2,624,947 | 1/1953 | Penker | 403/100 |
| 3,563,592 | 2/1971 | Preston | 403/102 X |
| 4,030,769 | 6/1977 | Peng et al. | 280/42 |
| 4,270,239 | 6/1981 | Gross | 403/100 X |

FOREIGN PATENT DOCUMENTS 10007 of 1908 United Kingdom .

Primary Examiner—David M. Mitchell
Assistant Examiner—Tamara L. Finlay
Attorney, Agent, or Firm—Peter C. Michalos

[57] ABSTRACT

A foldable stroller includes a safety lock for maintaining the stroller in an unfolded use condition. The stroller comprises side frames which are connected together by scissor frames to move the side frames between open use positions and closed folded positions. To maintain the side frames in a spread use position, a two-part spreader bar is provided. A lock in the form of a spring loaded slide on one of the spreader bar parts includes a lock and guide pin which engages a detente in the other spreader bar part to maintain the spreader bar part in an aligned condition. This avoids an inadvertant folding of the stroller. To permit folding of the stroller this slide is pushed to the side disengaging the pin from the detente and permitting the spreader bar parts to be lifted. This allows the side frames to collapse toward each other resulting in the folding of the stroller.

16 Claims, 2 Drawing Sheets

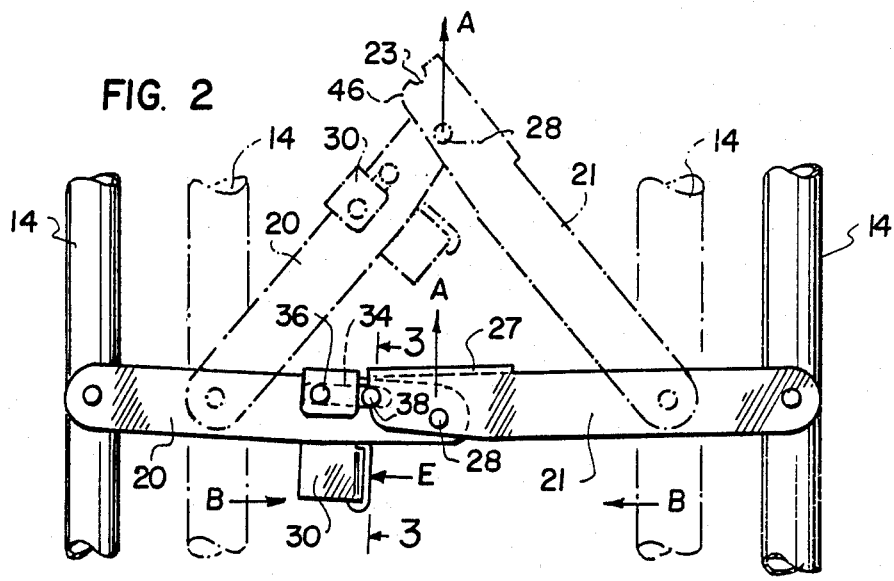
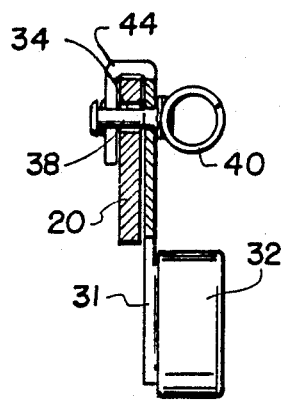
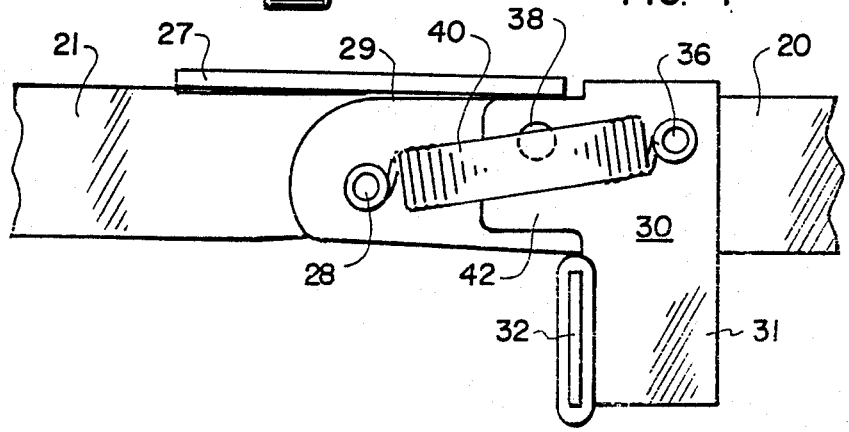

SAFETY SPREADER BAR LOCK FOR UMBRELLA STROLLER

FIELD AND BACKGROUND OF THE INVENTION

The present invention relates in general to strollers, and in particular to a new and useful spreader bar lock for a so-called umbrella stroller.

Umbrella strollers have been available for a considerable length of time. They generally comprise a pair of spaced apart side frames which are interconnected by bottom and back scissor frames. An articulated spreader bar is connected between the frames to hold the frames apart and a pliable fabric is stretched between the frames to form the stroller seat and stroller back for supporting an infant.

The umbrella strollers are generally folded by pivoting two parts of the spreader bar upwardly so that the scissor frames collapse to permit the side frames to move together. The side frames are then folded once more to yield a compact folded structure.

To maintain the umbrella stroller in its unfolded use position, the two parts of the spreader bar are maintained in a generally aligned condition between the stroller side frames. The spreader bar parts are generally held in their aligned position by gravity. To fold the stroller a person usually kicks or pushes the spreader bar upwardly using his or her foot. This begins the folding operation during which the frame collapses inwardly and forwardly. Ultimately the frame parts carrying the front wheels are folded up to the position of the stroller handles.

While pushing an infant in such a stroller, it sometimes happens that the person pushing the stroller inadvertently kicks the spreader bar upwardly. The weight of the child in the stroller in combination with the lifted spreader bar parts can then cause an inadvertant and extremely dangerous folding of the stroller. The spreader bar parts may also inadvertantly rise when the stroller hits a bump.

Due to the structure of the umbrella stroller and its folding mechanism, once the spreader bar parts are lifted the front wheels are no longer held down against the ground. They tend to pivot upwardly which causes the entire stroller to lunge forward. This is a serious safety hazard to an infant sitting in the stroller.

SUMMARY OF THE INVENTION

The present invention is drawn to a safety lock for positively locking the spreader bar parts of a stroller in their spread position so that an inadvertant folding of the stroller becomes impossible.

The safety lock comprises a spring-loaded slideable member which is mounted to one of the spreader bar parts and which carries a fixing pin. The other spreader bar part carries a notch or detente which, with the spreader bar parts aligned with each other, prevents them from pivoting.

The spreader bar part which carries the notch or detente also carries a top flange which engages over a top edge of the other spreader bar part to prevent the spreader bar parts from pivoting down beyond their aligned position.

In order to unlock the spreader bar, the slide member must first be slid to one side, using the foot for example, and then the spreader bar parts can be lifted, using the same foot.

Accordingly an object of the invention is to provide a lock for spreader bar parts in a stroller which includes a safety feature to prevent inadvertant pivoting of the spreader bar parts.

A further object of the invention is to provide a safety spreader bar lock for a stroller which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings

FIG. 2 is a rear elevational view of the spreader bar and safety lock in accordance with the present invention;

FIG. 3 is an enlarged sectional view taken along line 3—3 of FIG. 2;

FIG. 4 is an enlarged fragmentary rear elevational view of the spreader bar and safety lock of FIG. 2.

DESCRIPTION OF THE PREFERRED EMBODIMENT

Figure 1:
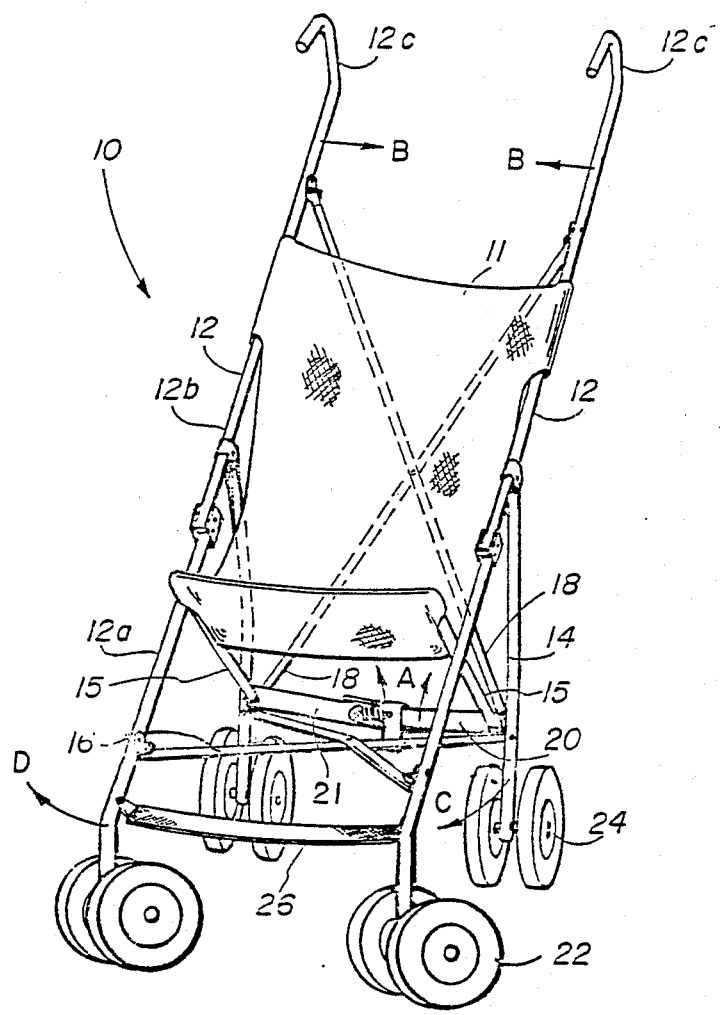
FIG. 1 is a perspective view showing a typical umbrella stroller with the inventive spreader bar lock attached.

Referring to the drawings in particular, the invention embodied in FIG. 1 comprises a spreader bar lock for a spreader bar 20, 21 which securely locks the side frames of a stroller generally designated 10, in its open, use position.

Stroller 10 is known as an "umbrella" stroller. The term umbrella is used due to the hook-shaped handles 12c, 12c of the stroller that resemble umbrella handles.

Umbrella stroller 10 comprises a pair of spaced apart side frames each having a main side tube 12 and a rear side tube 14. Tubes 12 and 14 are pivotally connected to each other and respectively carry the front wheels 22 and the rear wheels 24 of the stroller.

The main side tubes 12 each comprise a lower tube portion 12a which is pivotally mounted to an upper tube porition 12b. The upper portion carries the hook-shaped handles 12c and the lower portion carries the front wheels 22.

A lower scissor frame 16 and a back scissor 18 interconnect the side tubes 12, 14. A spreader bar having two parts 20, 21 which are pivotally mounted together, is pivotally mounted between the rear side tubes 14 to hold the side frames apart. In this use position, a flexible fabric seat plus back combination 11 is stretched across the side frames to provide a seating area for an infant. A seat tube 15 is articulated between the rear and main side tubes to support the front edge of the seat.

A flexible foot strap 26 is stretched between the lower portions 12a of the side tubes 12.

The stroller 10 is of conventional and readily available design so that additional details will not be provided here. Any foldable stroller having side tubes can be used in combination with the present invention.

In order to fold the stroller shown in FIG. 1, the safety lock of the present invention is first activated, as will be explained in greater detail later, and then the spreader bar parts 20 and 21 are lifted in the direction of arrows A shown in FIG. 1. This causes the side frames to move together in the direction of arrows B, B. At the same time the presence of the now collapsing upper and lower scissors frames 18 and 16 causes the rear side tubes 14 to pivot forwardly in the direction of arrow C. This is in addition to the movement of rear side tubes 14 together in the direction of arrows B, B.

Due to the pivotal connection between the upper and lower tube portions 12b and 12a of the main side tubes 12, the lower tube portions 12a can be pivoted upwardly in the direction of arrow D to be ultimately brought into the vicinity of the handles 12c, 12c.

Without the safety lock of the present invention, the spreader bar parts 20 and 21 can be inadvertently kicked to move them upwardly in the direction of arrows A. Likewise, striking a bump while pushing the carriage can also cause this inadvertant movement of the spreader bar. Since nothing else holds the side frames apart, this upward movement of the spreader bar begins the folding process. With an infant seated in the cloth seat and back, the weight of the infant causes the folding operation to accelerate with the front wheels 22 on their lower tube portions 12a moving rapidly upwardly in the direction of arrow D. This is an extremely dangerous hazard for the infant in the stroller.

Turning to FIGS. 2 through 4, the spreader bar comprises the first spreader bar part 20 which is pivotally mounted to one of the side frames, specifically the rear side tube 14, and a central pivot 28. The spreader bar also comprises the second bar part 21 which is pivotally mounted between the other rear side tube 14 and the pivot 28. As shown in phantom line in FIG. 2, spreader bar parts 20, 21 are pivotally mounted to each other at 28 so that they can pivot upwardly to permit the side frames to move together to initiate the folding operation. As also visible in the phantom line portions of FIG. 2, spreader bar part 21 includes a recess or detente 23 at its end. In its horizontal, lowered and locked position, a lock and guide pin 38 is seated within the detente 23 to maintain the spreader bar parts 20 and 21 in their aligned positions.

Lock and guide pin 38 is fixed to a slide 30 which is slideably mounted to the first bar part 21. To maintain a parallel sliding of the slide 30 on the part 20, a second guide pin 36 is also fixed to the slide 30. Both pins 36 and 38 ride within a slot 34 defined through the first spreader bar part 20.

To urge the slide 30 toward the second spreader bar part 21, a spring 40 is provided and connected between a rivet that secures the central pivot 28 and a rivet that secures the guide pin 36. Spring 40 urges the lock and guide pin 38 into engagement with the detente 23.

As best shown in FIG. 4, slide 30 includes a side projection 42 which lies on an inner surface of the bar part 20, and a downwardly extending tab 31. Tab 31 includes an angle portion 32 which extends perpendicularly to the plane containing the bar part 20. As shown in FIG. 3, angle portion 32 can be padded, for example by a layer of rubber or plastic material.

FIG. 3 also illustrated the guide leg 44 which is formed as a single part with the slide 30 and which is bent to engage over the top of the bar part 20. Guide pin 36 extends through the guide leg 44 while, as viewed from FIG. 3, lock and guide pin 38 is positioned in front of the guide leg 44.

The guide leg 44 and side projection 42 also help in the linear alignment and sliding action of slide 30 on bar part 20.

Bar part 21 also includes an upper flange 27 which is bent over the top edge 29 of the first bar part 20 and also over the side projection 42. At least a portion of the flange 27 extends deeper into the bar part 20 than the location of the pivot 28. This positioning of flange 27 prevents the pivotally connected bar parts 20 and 21 from pivoting downardly beyond their position shown in FIG. 2.

With the stroller in its open use position, an operator must first push the slide 30 to the left as shown in FIG. 2, preferably by using the foot which is pressed against the angle portion 32. This disengages lock and guide pin 38 from detente 23 against the bias of spring 40. The same foot can then be used to raise both bar parts 20 and 21 to move them into their phantom line position shown in FIG. 2. This permits the folding of the stroller.

To unfold and lock the stroller, the lower tube portions 12a are first pivoted down and then the side frames are spread. With the bar parts in their phantom line position shown in FIG. 2, the foot again can be used to push the bar parts downwardly. The flange 27 also helps in this regard to provide a foothold for this action.

Bar part 21 is provided with a curved edge 46 which is just below the detente 23 to act as a cam which engages guide pin 38 and urges it to the left in FIG. 2. Once the bar parts reach their aligned solid line position, the pin 38 snaps into the detente 23.

While a specific embodiment of the invention has been shown and described in detail to illustrated the application of the principles of the invention, it will be understood that the invention may be embodied otherwise without departing from such principles.

What is claimed is:

1. A foldable stroller with safety lock, comprising a pair of side frames each having a main side tube, a bottom scissor frame connected between said side frames, a back scissor frame connected between said side frames, said scissor frames permitting movement together and apart of said side frames, a spreader bar having first and second parts pivotally connected between said side frames for holding said side frames apart, a flexible fabric seat and back combination connected between said side frames, a slide slidably mounted to said first part of said spreader bar, a lock pin connected to said slide, said second part of said spreader bar including a detente for engaging said lock pin to hold said spreader bar in an aligned use position for maintaining said side frames in a spread use position, a spring operatively connected to said slide for urging said lock pin into engagement with said detente, and a tab extending beyond said first part of the spreader bar and connected to said slide for engagement by the foot of an operator to slide said slide, said second part of said spreader bar includes a curved edge below said detente for engaging said lock pin to move said slide against the bias of said spring when said first and second spreader bar parts move to their aligned position, said first part including a slot, a guide pin fixed to said slide, said guide and lock pins both being slidably engaged in said slot for guiding said slide for sliding movement to said first part.

2. A foldable stroller with safety lock according to claim 1 wherein each said main side tube has an upper tube portion with an upper end carrying a handle and a lower tube portion pivotally mounted to said upper tube portion, each side frame comprising a rear side tube pivotally mounted to said upper tube portion, said spreader bar being pivotally mounted between rear side tubes of said side frames, each of said scissor frames comprising a pair of cross members pivotally mounted to each other and pivotally mounted between side frames.

3. A foldable stroller with safety lock according to claim 2 including front wheels rotatably mounted to each of said lower tube portions and rear wheels rotatably mounted to each of said rear side tubes.

4. A foldable stroller with safety lock according to claim 3 wherein said first part includes a slot, a guide pin fixed to said slide, said guide and lock pins both being slideably engaged in said slot for guiding said slide for sliding movement to said first part.

5. A foldable stroller with safety lock, comprising a pair of side frames each having a main side tube, a bottom scissor frame connected between said side frames, a back scissor frame connected between said side frames, said scissor frames permitting movement together and apart of said side frames, a spreader bar having a first and second parts pivotally connected between said side frames for holding said side frames apart, a flexible fabric seat and back combination connected between said side frames, a slide slideably mounted to said first part of said spreader bar, a lock pin connected to said slide, said second part of said spreader bar including a detente for engaging said lock pin to hold said spreader bar in an aligned use position for maintaining said side frames in a spread use position, a spring operatively connected to said slide for urging said lock pin into engagement with said detente, said second part of said spreader bar including a curved edge below said detente for engaging said lock pin to move said slide against the bias of said spring when said first and second spreader bar parts move to their aligned position, said first part including a slot, a guide pin fixed to said slide, said guide and lock pins both being slidably engaged in said slot for guiding said slide for sliding movement to said first part.

6. A foldable stroller with safety lock according to claim 5 wherein said first and second parts of said spreader bar are pivotally mounted to each other at a central pivot, said second part including a flange extending over an upper edge of said first part spaced away from said central pivot.

7. A foldable stroller with safety lock according to claim 6 wherein said slide includes a guide leg engaged over said first part for guiding the sliding movement of said slide on said first part.

8. A foldable stroller with safety lock according to claim 7 wherein said slide includes a side projection extending under said flange of said second part with said first and second parts of the spreader bar in their aligned position.

9. A foldable stroller with safety lock according to claim 7 wherein said guide pin extends through said guide leg.

10. A foldable stroller with safety lock according to claim 7 wherein said slide includes a tab extending beyond said first part of the spreader bar and an angle position connected to said tab extending perpendicularly to said tab.

11. A foldable stroller with safety lock, comprising a pair of side frames each having a main side tube, a bottom scissor frame connected between said side frames, a back scissor frame connected between said side frames, said scissor frames permitting movement together and apart of said side frames, a spreader bar having first and second parts pivotally connected between said side frames for holding said side frames apart, a flexible fabric seat and back combination connected between said side frames, a slide slideably mounted to said first part of said spreader bar a lock pin connected to said slide, said second part of said spreader bar including a detente for engaging said lock pin to hold said spreader bar in an aligned use position for maintaining said side frames in said spread use position, and a spring operatively connected to said slide for urging said lock pin into engagement with said detente, each main side tube having an upper tube portion with an upper end carrying a handle and a lower tube portion pivotally mounted to said upper tube portion, each side frame comprising a rear side tube pivotally mounted to said upper tube portion, said spreader bar being pivotally mounted between rear side tubes of said side frames, each of said scissor frames comprising a pair of cross members pivotally mounted to each other and pivotally mounted between side frames, front wheels rotatably mounted to each of said lower tube portions and rear wheels rotatably mounted to each of said rear side tubes, said first part includes a slot, a guide pin fixed to said slide, said guide and lock pins both being slideably engaged in said slot for guiding said slide for sliding movement to said first part.

12. A foldable stroller with safety lock according to claim 11 wherein said first and second parts of said spreader bar are pivotally mounted to each other at a central pivot, said second part including a flange extending over an upper edge of said first part spaced away from said central pivot.

13. A foldable stroller with safety lock according to claim 12 wherein said slide includes a guide leg engaged over said first part for guiding the sliding movement of said slide on said first part.

14. A foldable stroller with safety lock according to claim 13 wherein said slide includes a side projection extending under said flange of said second part with said first and second parts of the spreader bar in their aligned position.

15. A foldable stroller with safety lock according to claim 13 wherein said guide pin extends through said guide leg.

16. A foldable stroller with safety lock according to claim 13 wherein said slide includes a tab extending beyond said first part of the spreader bar and an angle position connected to said tab extending perpendicularly to said tab.

* * * * *